United States Patent [19]
Toki et al.

[11] Patent Number: 5,619,098
[45] Date of Patent: Apr. 8, 1997

[54] PHOSPHOR AND FLUORESCENT DISPLAY DEVICE

[75] Inventors: Hitoshi Toki; Shigeo Itoh; Fumiaki Kataoka, all of Chiba-ken, Japan

[73] Assignee: Futaba Denshi Kogyo K.K., Japan

[21] Appl. No.: 529,058

[22] Filed: Sep. 15, 1995

[30] Foreign Application Priority Data

Sep. 16, 1994 [JP] Japan ................................ 6-248589

[51] Int. Cl.⁶ .............................. H01J 1/62; C09K 11/08
[52] U.S. Cl. ........................... 313/496; 313/468; 427/64; 252/301.4 F
[58] Field of Search ........................ 313/495, 496, 313/497, 503, 463, 467, 468; 427/157, 64; 252/301.4 F

[56] References Cited

U.S. PATENT DOCUMENTS

| | | | |
|---|---|---|---|
| 3,264,133 | 8/1966 | Brooks | 427/64 |
| 3,725,811 | 4/1973 | Murphy | 252/301.4 F |
| 3,728,594 | 4/1973 | Yim et al. | 313/503 |
| 5,367,173 | 11/1994 | Morlotti | 252/301.4 F |

*Primary Examiner*—Michael Horabik
*Assistant Examiner*—Michael Day
*Attorney, Agent, or Firm*—Breiner & Breiner

[57] ABSTRACT

A phosphor is disclosed which is suitable for use for a fluorescent display device and driven at a driving voltage as low as 1 kV or less and free of S and Cd. Compounds of Ti, alkaline earth metal and an element of Group 13 of the periodic table in predetermined amounts are heated at 1100° to 1400° C. for calcination, resulting in a solid solution of the rare earth element and one element of Group 13 being formed in a phosphor matrix made of an oxide of alkaline earth metal and Ti. An example of the phosphor is $SrTiO_3$:Pr, Al exhibiting a red luminous color.

11 Claims, 8 Drawing Sheets

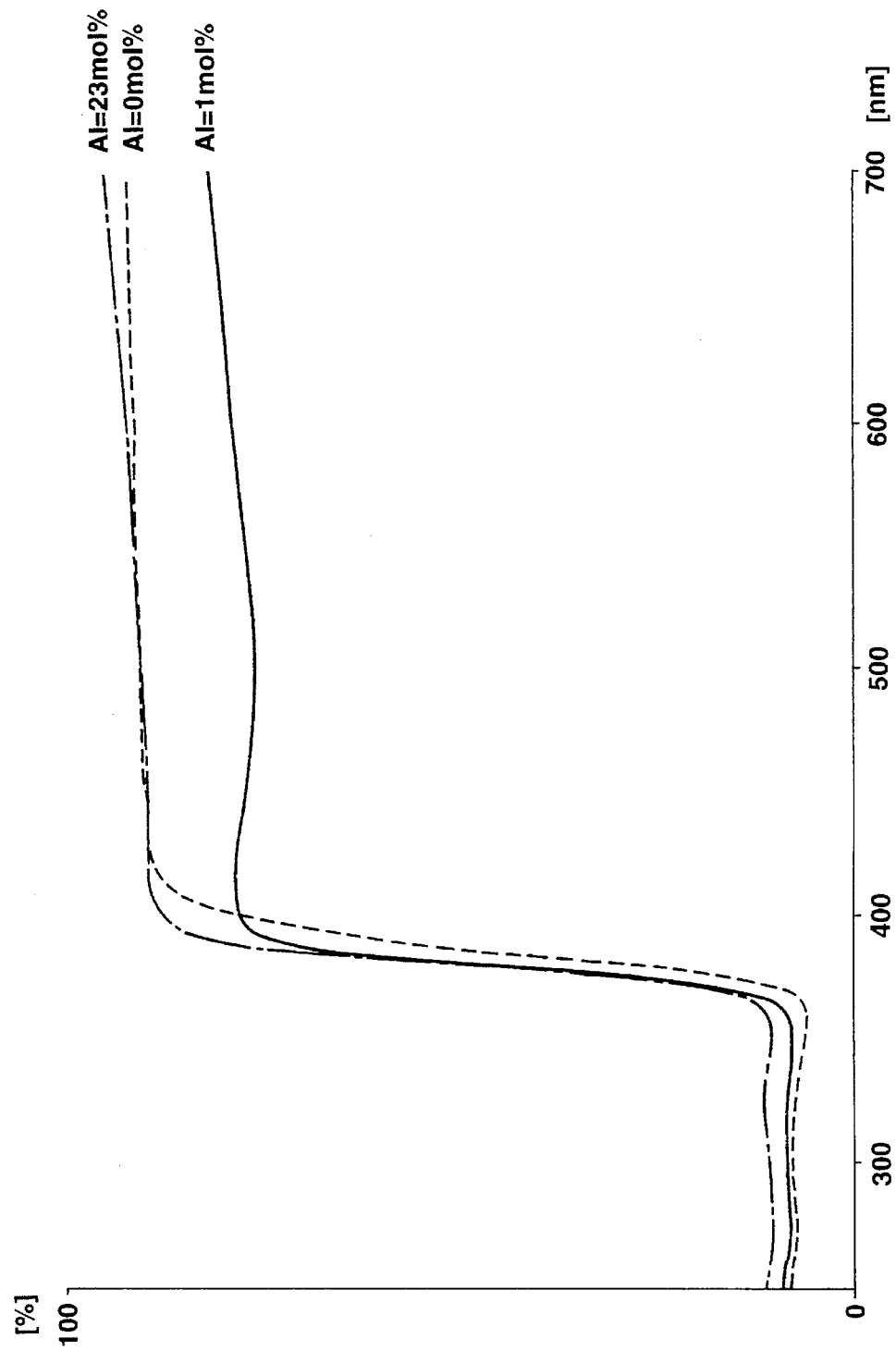

AMOUNT OF ADDITION OF Al

ANODE VOLTAGE

PHOSPHOR AND FLUORESCENT DISPLAY DEVICE

BACKGROUND OF THE INVENTION

This invention relates to a fluorescent display device including an anode which emits light upon impingement of electron beams thereon and a phosphor used for the anode, and more particularly to a fluorescent display device of the type that a phosphor-deposited anode is driven under a driving voltage as low as 1 kV or less (hereinafter also referred to "VFD") and a phosphor used therefor and a fluorescent display device of the type that a field emission type cathode is used for an electron source (hereinafter referred to as "FED") and a phosphor used therefor.

For operation of a VFD or an FED for luminous display while keeping a driving voltage of an anode at a level of 1 kV or less, it is required to use a low-velocity electron excited phosphor. A low-velocity electron excited phosphor conventionally used for this purpose is generally classified into two types depending on a resistance value exhibited by a matrix of the phosphor.

One type is a phosphor including a phosphor matrix of a low resistance value. The phosphors of this type include, for example, a phosphor of a blue-green luminous color represented by a general formula ZnO:Zn, a phosphor of a blue luminous color represented by a general formula $ZnGa_2O_4$, which have been put to practical use. Also, the phosphors of this type include, in addition to the phosphors of blue-green and blue luminous colors described above, a phosphor of a red luminous color represented by a formula $SnO_2$:Eu and the like. Unfortunately, the phosphors of luminous colors other than blue-green and blue are not only disadvantageously decreased in luminance, but deteriorated in luminous efficiency because luminance is saturated at a driving voltage above a predetermined level. Also, it is deteriorated in life characteristics. This results in the phosphors of luminous colors other than blue-green and blue failing to be put to practical use.

The other type is a phosphor including phosphor matrix of a high resistance value and a conductive material. The conductive material is added to the phosphor matrix, resulting in a phosphor layer then formed of the phosphor being reduced in apparent resistance value. The phosphors of this type include, for example, a phosphor comprising a phosphor matrix such as ZnS, ZnCdS or the like having a luminous center such as Ag, Au, Cu or the like added thereto for formation of a solid solution, as well as $In_2O_3$ in an mount of several % mixed with the phosphor matrix so as to act as a conductive material, which has been put to practical use.

More specifically, the phosphors of the latter type include sulfide phosphors including, for example, a phosphor of a blue luminous color such as ZnS:Zn, ZnS:Ag or the like, that of a green luminous color such as ZnS:Cu,Al, $(Zn_{0.6}Cd_{0.4})$S:Ag,Cl or the like, and that of a green luminous color such as $(Zn_{0.22}Cd_{0.78})$S:Ag,Cl or the like.

Such phosphors each include a phosphor matrix having S contained therein, resulting in being named a sulfide phosphor. The sulfide phosphor tends to be readily decomposed due to impingement of electrons thereon. The decomposition causes a sulfide material to be scattered in a fluorescent display device as widely known in the art. The sulfide material thus scattered is deposited on a filamentary cathode arranged in the fluorescent display device, leading to contamination of the cathode, resulting in the cathode being deteriorated in electron emission capability or characteristics. Also, the sulfide material is deposited on other oxide phosphors as well, leading to contamination of an anode likewise arranged in the fluorescent display device. Further, when the sulfide phosphor includes a ZnCdS phosphor matrix, it would cause a further environmental problem because of containing Cd which is widely known to be a pollutant.

In addition to the above-described sulfide phosphors, there has been also known a phosphor of a red luminous color such as $Y_2O_3$:Eu. The phosphor is disadvantageously increased in insulating properties, so that it is required to add a large amount of $In_2O_3$ thereto. Unfortunately, this causes a reactive current flowing through $In_2O_3$ to be increased, to thereby reduce efficiency of luminescence of the phosphor in a low-voltage driving region and deteriorate reliability of the phosphor.

Further, a proposal has been made for reducing a particle size of a phosphor to a level as small as 0.1 micron and reduce a thickness of a phosphor layer, to thereby reduce a resistance value of the phosphor. However, the proposal fails to provide a phosphor increased in luminous efficiency while keeping a particle size of the phosphor at a level as low as 1 micron or less.

SUMMARY OF THE INVENTION

The present invention has been made in view of the foregoing disadvantage of the prior art.

Accordingly, it is an object of the present invention to provide a phosphor of the sulfide-free type which is free of S, as well as Cd and capable of being effectively excited for luminescence by low-velocity electron beams.

It is another object of the present invention to provide a phosphor which is capable of preventing an environmental problem and exhibiting satisfactory luminous characteristics.

It is a further object of the present invention to provide a fluorescent display device which is capable of significantly decreasing an anode driving voltage and ensuring satisfactory luminous display.

In accordance with one aspect of the present invention, a phosphor is provided. The phosphor comprises a phosphor matrix made of an oxide of alkaline earth metal and Ti, and a rare earth element and an element of Group 13 of the periodic table which are added to the phosphor matrix.

In a preferred embodiment of the present invention, the alkaline earth metal is one selected from the group consisting of Mg, Sr, Ca and Ba.

In a preferred embodiment of the present invention, the rare earth element is one selected from the group consisting of Ce, Eu, Tb, Er, Tm and Pr.

In a preferred embodiment of the present invention, the rare earth element is added in an amount of 0.05 to 5 mol %.

In a preferred embodiment of the present invention, the element of Group 13 is one selected from the group consisting of Al, Ga, In and Tl.

In a preferred embodiment of the present invention, the element of Group 13 is added in an amount of 0.05 to 80 mol %.

In accordance with another aspect of the present invention, a fluorescent display device is provided. The fluorescent display device includes a vacuum envelope, and an electron source and a phosphor layer which are arranged in the vacuum envelope. The phosphor layer is made of a phosphor and emits light upon impingement of electrons emitted from the electron source thereon. The phosphor includes a phosphor matrix made of an oxide of alkaline earth metal and Ti, and a rare earth element and an element of Group 13 of the periodic table which are added to the phosphor matrix.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 2 is a diagrammatic view showing spectral reflectance of s $SrTiO_3$:Pr,Al phosphor of the present invention measured while varying the amount of addition of Al in a range of 0 to 23 mol %;

DETAILED DESCRIPTION OF THE PREFERRED EMBODIMENTS

Now, the present invention will be described hereinafter with reference to the accompanying drawings.

Figure 8:
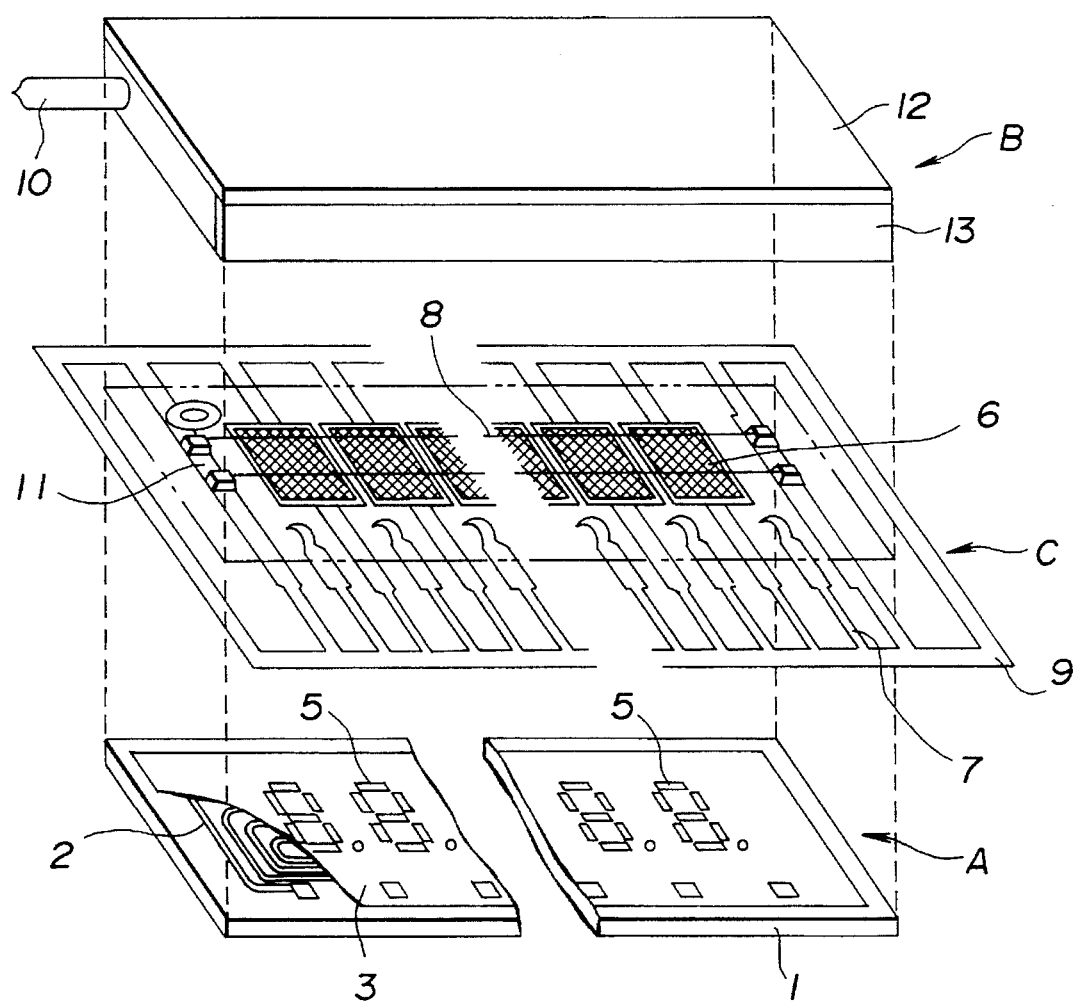
FIG. 8 is an exploded perspective view showing a VFD in which a phosphor of the present invention is incorporated.
Figure 9:
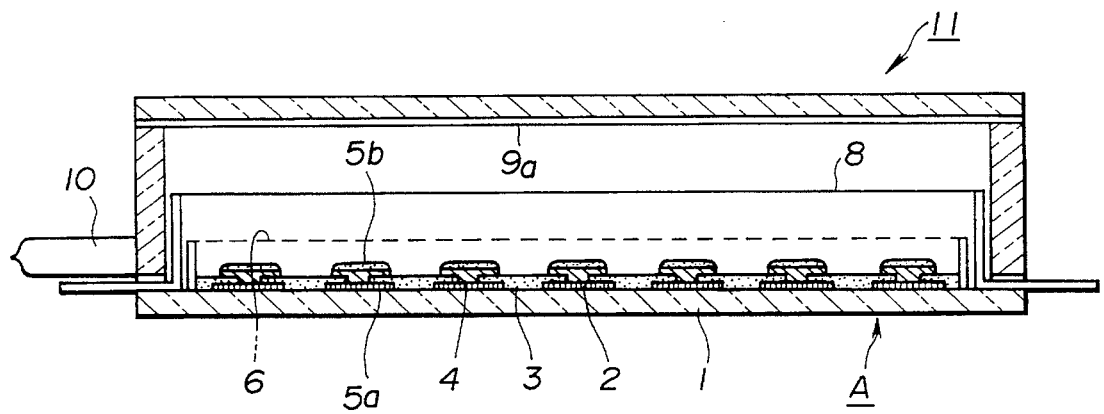
FIG. 9 is a vertical sectional view of the VFD shown in FIG. 8.

Referring first to FIGS. 8 and 9, a VFD which has a phosphor of the present invention incorporated therein is illustrated. The VFD includes an envelope H formed by sealedly joining an anode substrate A and a front casing B by means of a glass sealing material with an electrode structure C being interposedly arranged therebetween while being arranged on the anode substrate A.

The anode substrate A includes a glass plate 1 having an Al film formed on a front or upper surface thereof by electrodeposition, which is then subject to photolithography, to thereby provide a wiring pattern 2. The wiring pattern 2 has an insulating layer 3 deposited on an upper surface thereof. The insulating layer 3 is made of an insulating paste mainly consisting of frit glass by screen printing. The insulating layer 3 is formed with through-holes 4 which permit the wiring pattern and anode conductors 5a described hereinafter to be connected to each other therethrough. The through-holes 4 each are charged therein with a conductive paste. The insulating layer 3 has a conductive paste deposited thereon so as to cover the through-holes 4, resulting in the above-described anode conductors 5a being provided. The conductive paste may mainly consist of carbon. The anode conductors 5a each have a phosphor layer 5b deposited thereon, to thereby provide anode electrodes. The anode conductors 5a and phosphor layers 5b thus formed cooperate with each other to provide an anode pattern 5.

The electrode structure C arranged on the anode substrate A includes a spacer frame 9 made of 426 alloy (42% of Ni, 6% of Cr and balance of Fe), and grid electrodes 6 and cathode electrodes 8 each mounted on the spacer frame 9. The spacer frame 9 is integrally provided thereon with lead terminals 7 through which a voltage is applied to the anode electrodes, cathode electrodes and grid electrodes. The cathode electrodes 8 each include a wire made of W or ReW (rhenium-tungsten) and an electron emitting layer made of (Ba, Sr, Ca)O and formed on the wire by electrodeposition. The cathode electrode 8 is fixed at each of both ends thereof to a support 11 comprising a support member and an anchor member welded onto the spacer frame 9.

The front casing B includes a front plate 12 made of a transparent glass material and a frame-like side plate 13 bonded or joined to a periphery of the front plate 12 by means of a glass adhesive. The side plate 13 is provided with an evacuation tube 10 through which gas in the envelope H is externally discharged, resulting in the envelope being evacuated to a high vacuum.

The anode substrate A is adhesively joined at a peripheral edge 2 thereof to a lower end of the side plate 13 of the front casing B by heating a glass adhesive applied to the lower end of the side plate 13 while interposedly holding the electrode structure C between the anode substrate A and the front casing B. This results in the envelope H of a flat box-like shape being provided, which is then evacuated to a high vacuum by means of the evacuation tube as described above, followed by sealing of the evacuation tube.

Figure 10:
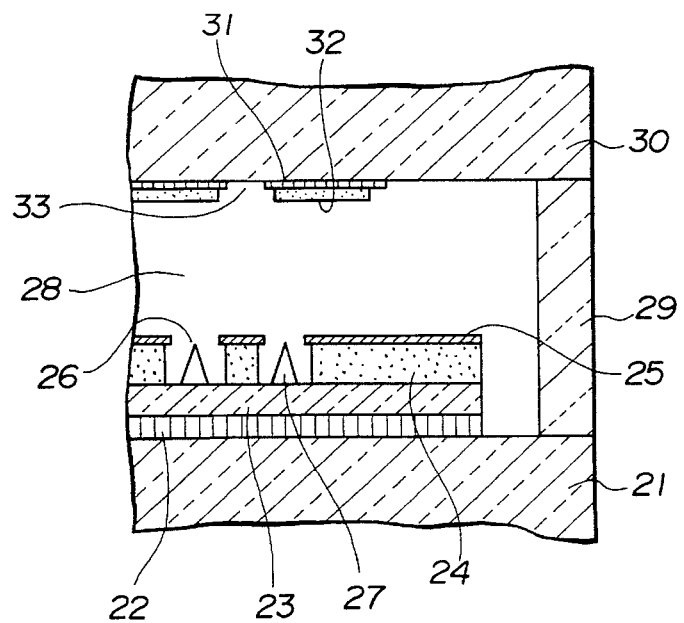
FIG. 10 is a fragmentary vertical sectional view showing an essential part of an FED (field emission display) in which a phosphor of the present invention is incorporated.

Referring now to FIG. 10, an FED (field emission display) is illustrated in which a phosphor of the present invention is incorporated.

The FED includes an envelope formed by sealedly joining a cathode substrate 21 having FECs formed thereon so as to act as an electron source to an anode substrate 30 having a phosphor of the present invention deposited thereon through a side plate 29. The cathode substrate 21 is made of a glass plate and formed on an upper or front surface thereof with cathode electrodes 22 by subjecting a metal film formed thereon by electrodeposition to etching. The cathode electrodes 22 each are laminatedly formed thereon with an insulating layer 24 of $SiO_2$ through a resistive layer 23, followed by laminating of a gate layer 25 of Nb on the insulating layer 24. Then, the gate layer 25 and insulating layer 24 are subject to etching, resulting in openings 26 which extend through both layers 24 and 25 being formed. Subsequently, the openings 26 each are provided therein with an emitter 27 of a conical shape in such a manner that a distal end of each of the conical emitters 27 is exposed through the opening 26. The conical emitters 27 are arranged at pitches of 10 μm or less defined therebetween by fine processing techniques. Thus, ten thousands to hundred thousands of FECs may be provided on the single cathode substrate 21.

Also, the conical emitters 27 each may be arranged in such a manner that a distance between the gate electrode 25 and the distal end of the conical emitter 27 is decreased to a level less than 1 μm. This permits electrons to be field-emitted from the conical emitters 27 by merely applying a voltage as low as tens of volts between the gate electrode 25 and the cathode electrode 22. The resistive layer 23 arranged between the cathode electrode 22 and the conical emitters 27 acts to stabilize operation of the conical emitters 27.

The anode substrate 30 is arranged opposite to the cathode substrate 21 in a manner to be spaced therefrom at a predetermined interval. The anode substrate 30 is formed on an inner surface thereof with a plurality of stripe-like anode electrodes 31, each of which has a phosphor layer 32 deposited thereon. The side plate 29 are arranged between the anode substrate 30 and the cathode substrate 21 so as to be positioned at a peripheral edge of each of the substrates, so that both substrates 30 and 21 may be rendered opposite to each other so as to be spaced from each other at a predetermined interval. The anode substrate 30, cathode substrate 21 and side plate 29 thus arranged cooperate with each other to provide an airtight envelope, of which an interior 28 is then evacuated to a high vacuum.

In the FED thus constructed, application of a voltage of a predetermined level between the cathode electrode 22 and the gate electrode 25 permits electrons to be field-emitted from the distal end of each of the conical emitters 27. Then, the electrons travel to the phosphor layers B2 to which a positive voltage is applied, to thereby excite the phosphor layers 32, leading to luminescence of the phosphor layers 32.

The anode electrodes may be in the form of a transparent electrode made of a material such as ITO (indiium-tin-oxide) or the like and the anode substrate BO may be made of a transparent glass material, so that luminescence of the phosphor layers 32 may be observed through the anode substrate 30.

Control of discharge of electrons from the conical emitters 27, each acting as an image cell unit permits a desired image to be displayed through the phosphor layers 32 of the anode electrodes 31.

Now, the phosphor of the present invention incorporated in each of the VFD and FED described above will be describe hereinafter.

A phosphor which comprises a phosphor matrix made of an oxide of alkaline earth metal A and Ti, and a rare earth element R and an element B of Group 13 of the periodic table each added to the phosphor matrix is generally represented by a general formula $ATiO_3$:RB. Now, a titanate phosphor of the present invention will be described in connection with $SrTiO_3$:Pr,Al by way of example in which Sr, Pr and Al are selected as the alkaline earth metal A, the rare earth element R and the element of Group 13, respectively.

In the example, $SrCO_3$ and $TiO_2$ were used as a starting material for the phosphor matrix and $PrCl_3$ and $Al(OH)_3$ were added to the starting material. These materials were weighed in predetermined amounts and then thoroughly mixed with each other, followed by calcination in an electric furnace at 1100° to 1400° C. for 1 to 6 hours. The electric furnace had an air atmosphere formed therein. Alternatively, a neutral atmosphere or a weak reducing atmosphere containing 1 to 20% of $H_2$ may be suitably used depending on the materials.

In general, a concentration of Pr is convenient in a range of from 0.1 to 2 mol %. In the example, it was constantly kept at 0.2 mol % in order to optimumly determine the amount of Al to be added or the amount of addition of Al.

Addition of Al was carried out while varying the amount thereof in a range of from 0 to 97 mol %. Samples of the phosphor thus prepared according to the above-described procedure were subject to various analyses to determine elements forming the phosphor, to thereby obtain the amount of addition of Al which is optimum. The results were as shown in TABLE 1.

TABLE 1

| Amount of Addition of Al (mol %) | Measured Al Quantity (mol %) | Ti:Sr (molar ratio) |
|---|---|---|
| 9 | 5 | 0.88:1 |
| 33 | 18.5 | 0.81:1 |
| 67 | 37.5 | 0.77:1 |
| 89 | 49.8 | 0.77:1 |

Figure 1A:
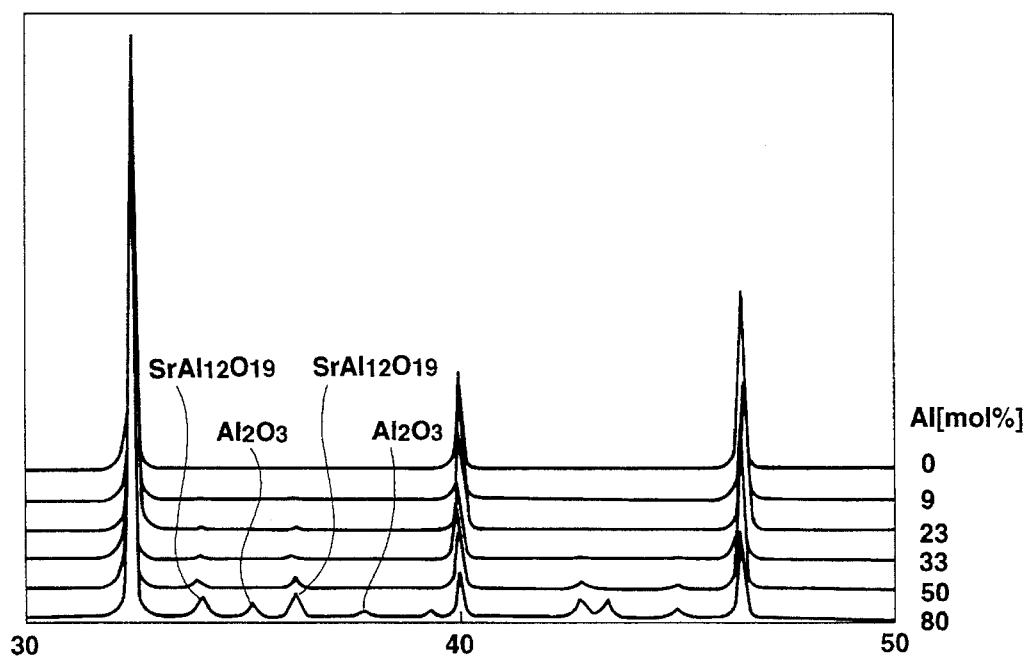
FIG. 1a is a diagrammatic view showing an X-ray diffraction pattern of a $SrTiO_3$:Pr,Al phosphor of the present invention obtained while varying the amount of addition of Al thereto in a range of 0 to 80 mol %.

As noted from TABLE 1, the Al content corresponded to 55 to 56% of the amount of addition of Al. An increase in the amount of addition of Al led to a decrease in ratio of Ti to Sr. This would be due to the fact that Al is substituted for a part of Ti of the $SrTiO_3$ phosphor matrix, to thereby form a solid solution in the matrix. The fact that Al forms a part of the solid solution is also revealed by FIG. 1a. More specifically, a main peak of $SrTiO_3$ is kept substantially unvaried irrespective of a variation in the amount of addition of Al in a range of from 0 to 80 mol %. The amount of Al equal to or below 50 mol % would permit Al to form a solid solution in $SrTiO_3$, because it leads to a failure in appearance of a peak of $SrAl_{12}$, $Al_2O_3$ or the like related with Al. The amount of addition of Al above 70 mol % causes a peak of a by-product such as $Al_2O_3$, $SrAl_{12}O_{19}$ or the like related with Al to be gradually increased.

FIG. 2 shows results of spectral reflectance of the phosphor measured when the amount of addition of Al is set to be 0 mol % for comparison, 1 mol % and 23 mol %, respectively. The results indicate that addition of Al even in a small amount causes a reflectance spectrum of the phosphor to be shifted toward a short wave side as compared with that obtained when Al is not added, to thereby vary optical characteristics of the phosphor, however, an increase in Al does not substantially cause any further variation.

Figure 3:
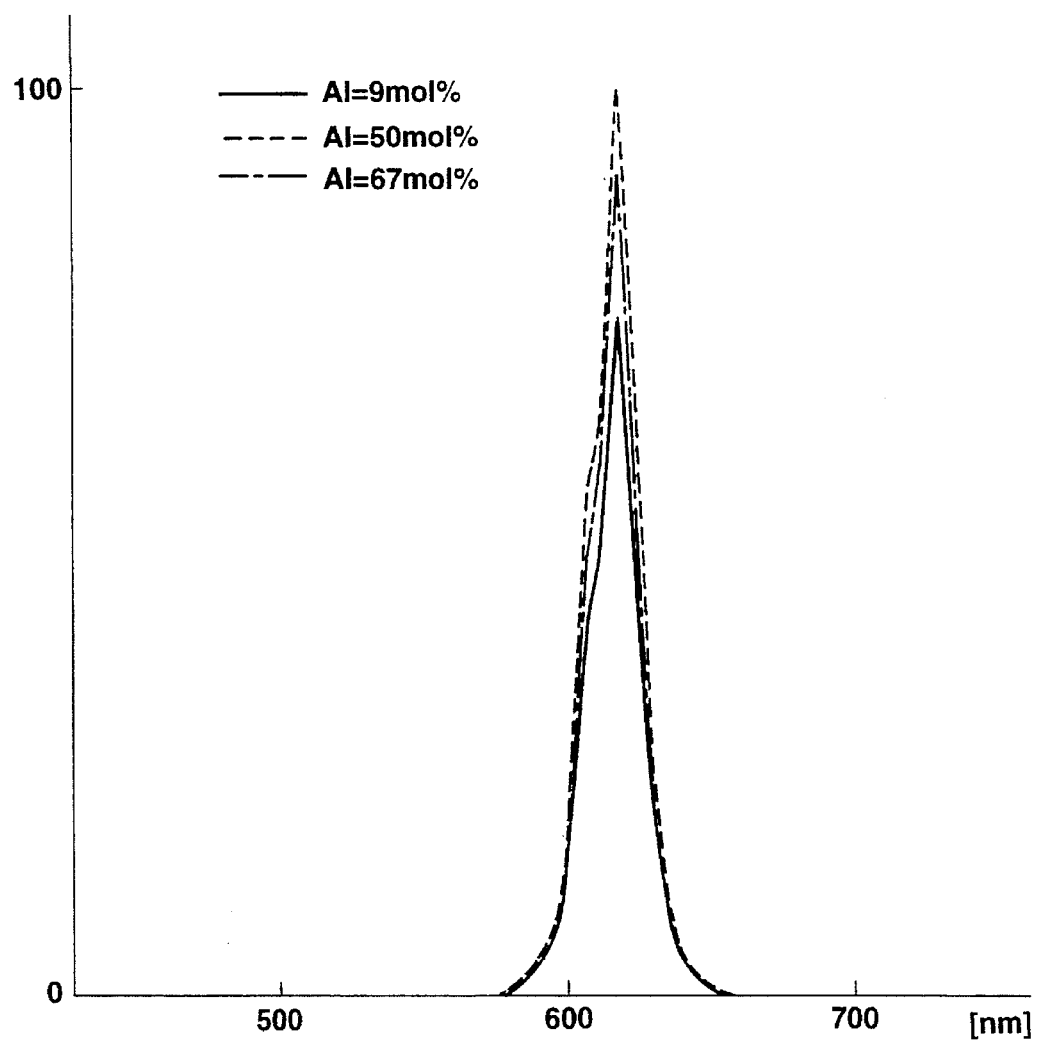
FIG. 3 is a diagrammatic view showing emission spectra of a $SrTiO_3$:Pr,Al phosphor of the present invention obtained while varying the amount of addition of Al in a range of 9 to 67 mol %.

FIG. 3 shows luminous spectra of the phosphor of the present invention. As noted from FIG. 2, the phosphor exhibits a red luminous color of which a peak wavelength has a peak at 17 nm irrespective of a variation in the amount of addition of Al among 9 mol %, 33 mol %, 50 mol % and 60 mol % and a variation in the amount of addition of Al does not substantially cause a variation in configuration of the spectrum. Thus, it was found that a variation in the amount of addition of Al does not cause a variation in red luminous characteristics of the phosphor.

Figure 7:
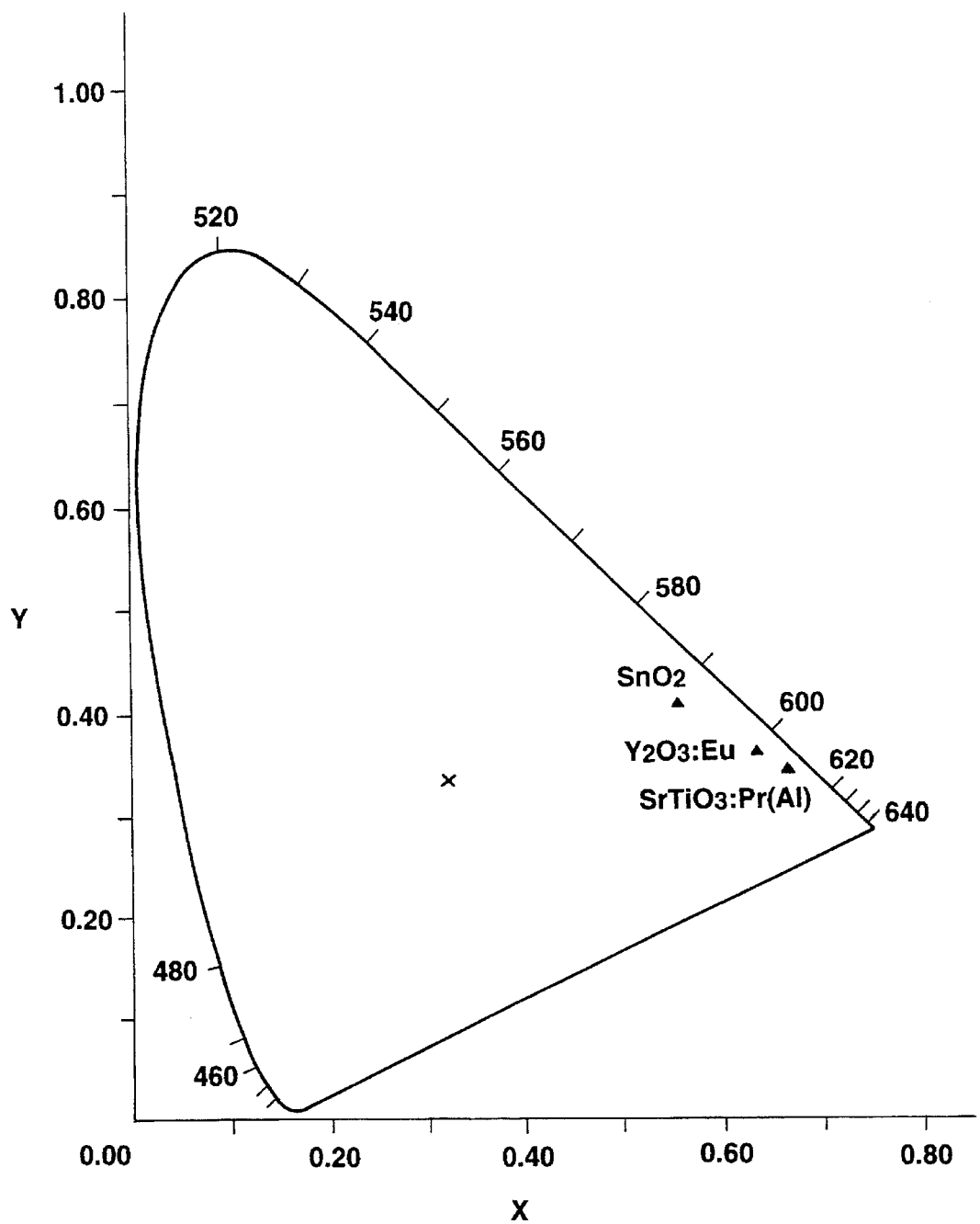
FIG. 7 is a CIE chromaticity diagram showing chromaticity of each of a $SrTiO_3$:Pr,Al phosphor of the present invention and conventional phosphors of a red luminous color.

FIG. 7 shows a CIE chromaticity of each of the phosphor of the present invention and conventional phosphors of a red luminous color. It indicates that the phosphor of the present invention having X×=0.66 and Y=0.35 has chromaticity shifted to a red side, to thereby act as a red phosphor of a red luminous color exhibiting excellent chromaticity, as compared with conventional $SnO_2$ and $Y_2O_3$:Eu phosphors of a red luminous color.

Figure 4:
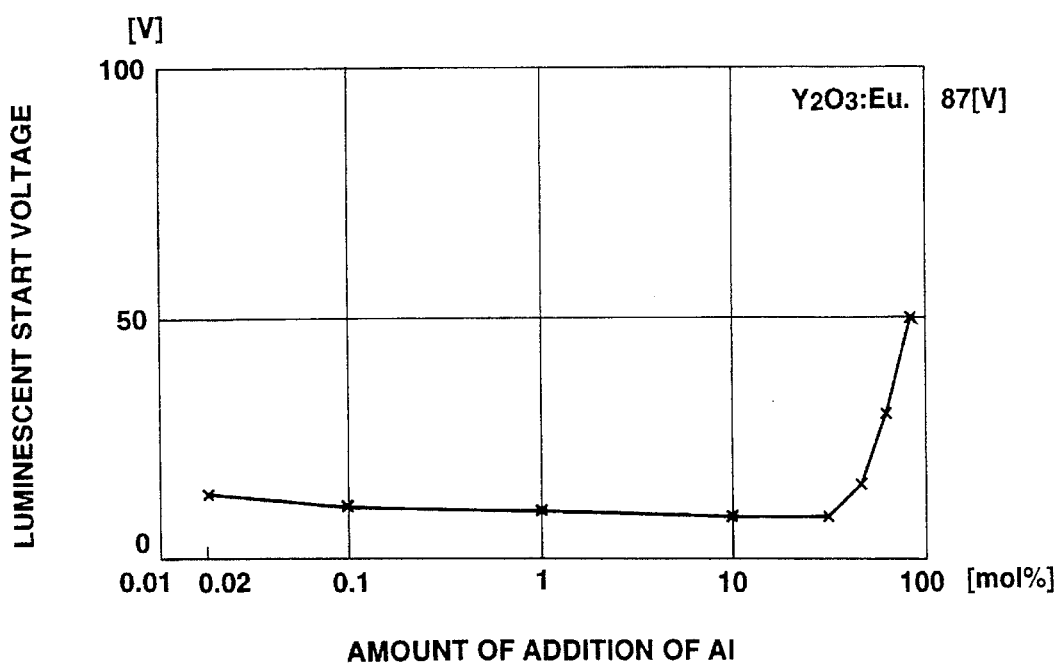
FIG. 4 is a graphical representation showing relationship between the amount of addition of Al in a $SrTiO_3$:Pr,Al phosphor of the present invention and a luminescence start voltage of the phosphor.

FIG. 4 shows relationship between a luminescence start voltage and the amount of addition of Al in the phosphor of the present invention obtained while mounting the phosphor on an anode of a fluorescent display device. FIG. 4 also shows, for comparison, a luminescence start voltage of a $Y_2O_3$:Eu phosphor of a red luminous color which has been conventionally put to practical use. The term "luminescence start voltage" used herein means an anode voltage which permits a phosphor to exhibit luminance of 1 $cd/m^2$ when it is excited while being mounted in a fluorescent display device. FIG. 4 indicates that although the phosphor free of Al fails to emit light, addition of Al even in a small amount permits the phosphor to emit light at a luminescence start voltage as low as 10 V or less.

Figure 5:
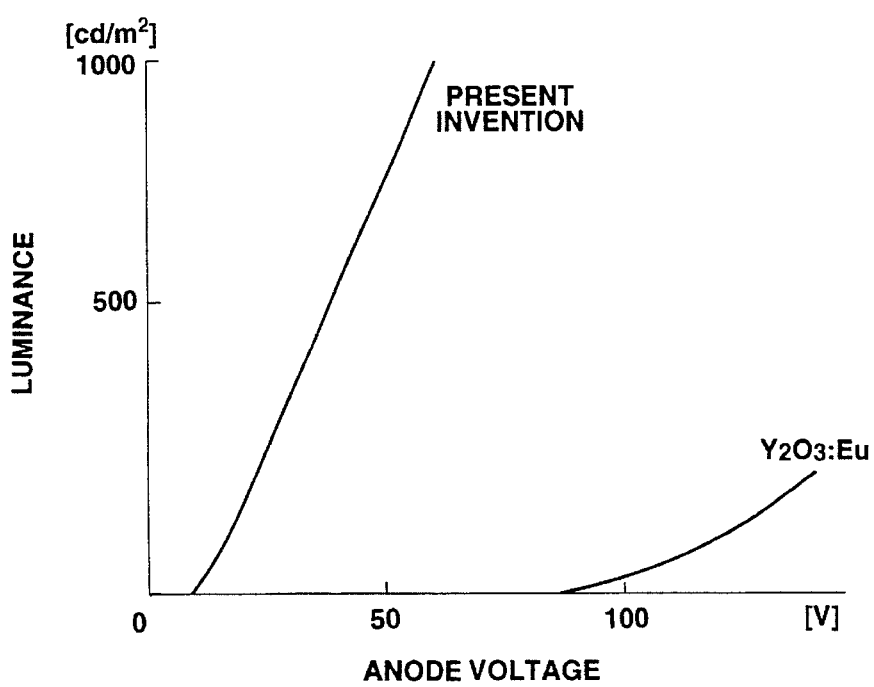
FIG. 5 is a graphical representation showing relationship between an anode voltage and luminance in each of a $SrTiO_3$:Pr,Al phosphor of the present invention and a conventional $Y_2O_3$:Eu phosphor.

On the contrary, the conventional $Y_2O_3$:Eu phosphor exhibits a luminescence start voltage as high as 80 V or more. Thus, it was found that the phosphor of the present invention exhibit increased luminance as compared with the conventional phosphor of a high resistance value. This is also revealed by FIG. 5 which shows voltage-luminance characteristics.

Figure 6:
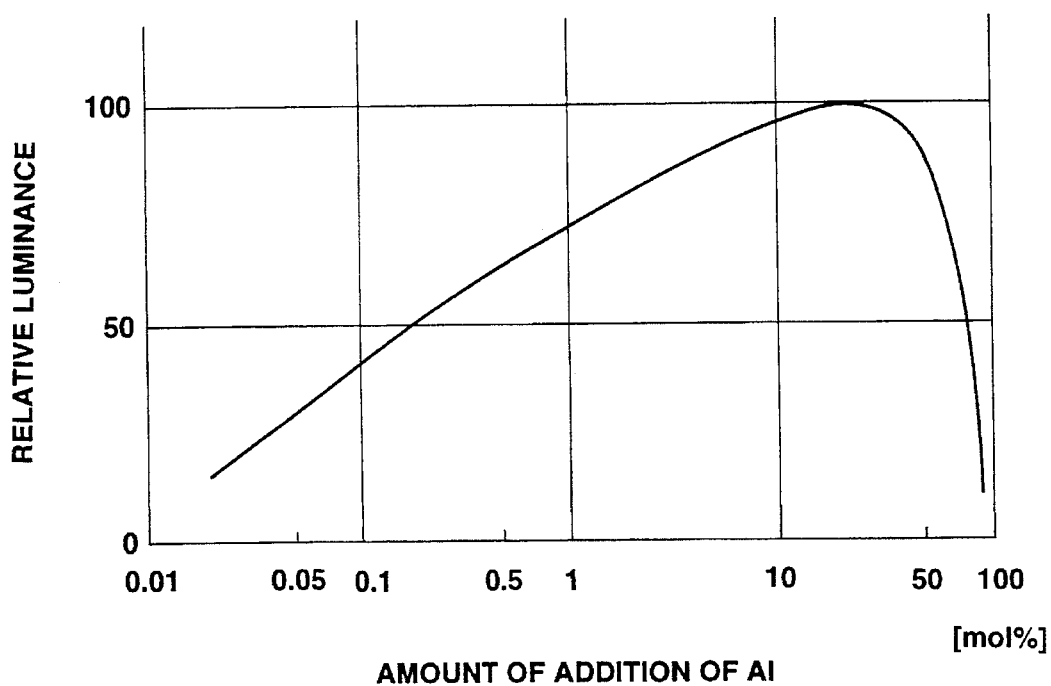
FIG. 6 is a graphical representation showing relationship between the amount of addition of Al and relative luminance in a $SrTiO_3$:Pr,Al phosphor of the present invention.

FIG. 6 shows relationship between the amount of addition of Al in the phosphor of the present invention and relative luminance thereof, wherein Pr and Al were added to the $SrTiO_3$ phosphor matrix in amounts of 0.1 to 2 mol % and 0.01 to 90 mol %, respectively. It indicates that addition of Al in an amount of 0.05 to 80 mol % permits the phosphor to exhibit luminance of a level sufficient to permit it to be put to practical use. The amount of addition of Al is more preferably in a range of from 0.2 to 70 mol % and most preferably in a range of 1 to 50 mol %.

Figure 1B:
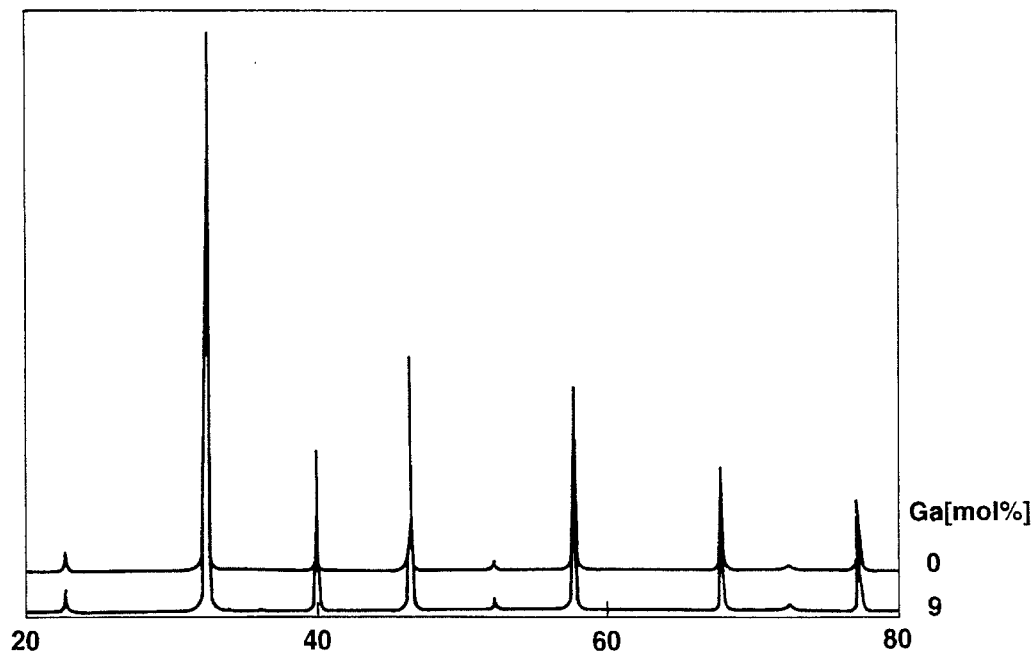
FIG. 1b is a diagrammatic view showing an X-ray diffraction pattern of a $SrTiO_3$:Pr,Ga phosphor of the present invention obtained while varying the amount of addition of Ga thereto in a range of 0 to 90 mol %.

Addition of Ga to the phosphor matrix permits the phosphor to exhibit substantially the same advantage as addition of Al described above. More particularly, as shown in FIG. 1b, addition of Ga in an amount of 9 mol % to $SrTiO_3$:Pr rendered a main peak of the phosphor substantially the same as that exhibited when Al was not added. Thus, a similar test took place while substituting Ga for A and, as a results, substantially the same results as with Al were obtained. Also, addition of each of In and Tl of Group 13 of the periodic table like Al and Ga permitted the phosphor to exhibit substantially the same results. For this purpose, an oxide such as $Ga_2O_3$ or SrO, a nitrate such as $Al(NO_3)$ or $Tl(NO_3)$, or a chloride may be used as the starting material.

In the example described above, Pr exhibiting a red luminous color was used as a rare earth element for the present invention by way example. It was found that Ce, Eu, Tb and Er, and Tm exhibit green-blue, red, green and blue luminous colors, respectively. An oxide of a rare earth element such as $Eu_2O_3$, a chloride thereof such as $EuCl_3$, or the like may be used for this purpose.

As can be seen from the foregoing, the phosphor of the present invention is so constructed that a rare earth element and one selected from the group consisting of Al, Ga, In and Tl are added in predetermined amounts to the phosphor matrix represented by $ATiO_3$ wherein A is one alkaline earth metal selected from the group consisting of Mg, Ca, Sr and Ba. Such construction provides a low-velocity electron excited phosphor exhibiting a desired luminous color at an anode voltage as low as 1 kV or less. In particular, the phosphor $SrTiO_3$:Pr,Al phosphor provided when Sr is selected as alkaline earth metal and Pr and Al are added to the phosphor matrix exhibits a luminescence start voltage as low as 10 V and a red luminous color having increased chromaticity as compared with the conventional phosphor of a red luminous color.

Also, the phosphor of the present invention is an oxide-type phosphor free of sulfur (S), resulting in eliminating disadvantages such as contamination of a cathode with sulfide, contamination of other phosphors in a fluorescent display device and the like which are encountered with the conventional color-luminous phosphor.

Further, the phosphor of the present invention is free of Cd, to thereby prevent occurrence of any environmental pollution due to Cd.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A phosphor comprising:
   a phosphor matrix made of an oxide of alkaline earth metal and Ti; and
   a rare earth element and an element of Group 13 of the periodic table which are added to the phosphor matrix.

2. A phosphor as defined in claim 1, wherein said alkaline earth metal is one selected from the group consisting of Mg, Sr, Ca and Ba.

3. A phosphor as defined in claim 1, wherein said rare earth element is one selected from the group consisting of Ce, Eu, Tb, Er, Tm and Pr.

4. A phosphor as defined in claim 1 or 3, wherein said rare earth element is added in an amount of 0.05 to 5 mol %.

5. A phosphor as defined in claim 1, wherein said element of Group 13 is one selected from the group consisting of Al, Ca, In and Tl.

6. A phosphor as defined in claim 1 or 5, wherein said element of Group 13 is added in an amount of 0.05 to 80 mol %.

7. A fluorescent display device comprising:
   a vacuum envelope; and
   an electron source and a phosphor layer which are arranged in said vacuum envelope;
   said phosphor layer being made of a phosphor and emitting light upon impingement of electrons emitted from said electron source thereon;
   said phosphor including a phosphor matrix made of an oxide of alkaline earth metal and Ti, and a rare earth element and an element of Group 13 of the periodic table which are added to said phosphor matrix.

8. A fluorescent display device as defined in claim 7, wherein said alkaline earth metal is one selected from the group consisting of Mg, Sr, Ca and Ba;
   said rare earth element is one selected from the group consisting of Ce, Eu, Tb, Er, Tm, and Pr; and
   said element of Group 13 is one selected from the group consisting of Al, Ga, In and Tl.

9. A fluorescent display device as defined in claim 7, wherein said rare earth element is added in an amount of 0.05 to 5 mol %; and
   said element of Group 13 is added in an amount of 0.05 to 80 mol %.

10. A fluorescent display device as defined in claim 7, said electron source comprises a filamentary cathode.

11. A fluorescent display device as defined in claim 7, wherein said electron source comprises a field emission cathode (FEC).

* * * * *